(12) United States Patent
Radier et al.

(10) Patent No.: US 11,924,671 B2
(45) Date of Patent: Mar. 5, 2024

(54) METHOD FOR MANAGING RESOURCES OF A CONVERGED FIXED ACCESS AND MOBILE RADIO TELECOMMUNICATIONS NETWORK, AND CORRESPONDING COMPUTER PROGRAM PRODUCT AND DEVICES

(71) Applicant: Orange, Issy-les-Moulineaux (FR)

(72) Inventors: Benoît Radier, Chatillon (FR); Nejm Eddine Frigui, Chatillon (FR); Veronica Karina Quintuna Rodriguez, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 176 days.

(21) Appl. No.: 17/415,611

(22) PCT Filed: Dec. 4, 2019

(86) PCT No.: PCT/FR2019/052922
§ 371 (c)(1),
(2) Date: Jun. 17, 2021

(87) PCT Pub. No.: WO2020/128202
PCT Pub. Date: Jun. 25, 2020

(65) Prior Publication Data
US 2022/0046461 A1 Feb. 10, 2022

(30) Foreign Application Priority Data
Dec. 20, 2018 (FR) ...................................... 1873463

(51) Int. Cl.
*H04W 28/02* (2009.01)
*H04W 28/18* (2009.01)
*H04W 72/543* (2023.01)

(52) U.S. Cl.
CPC ... *H04W 28/0268* (2013.01); *H04W 28/0247* (2013.01); *H04W 28/18* (2013.01); *H04W 72/543* (2023.01)

(58) Field of Classification Search
CPC ......... H04W 28/0247; H04W 28/0268; H04W 28/16; H04W 28/18; H04W 72/543
See application file for complete search history.

(56) References Cited

U.S. PATENT DOCUMENTS

| | | | |
|---|---|---|---|
| 2009/0034432 A1* | 2/2009 | Bonta ................... | H04W 74/02 370/255 |
| 2013/0084826 A1* | 4/2013 | Mo ...................... | H04L 12/1407 455/406 |
| 2013/0268671 A1* | 10/2013 | Anderson ............. | H04W 16/04 709/226 |

OTHER PUBLICATIONS

Frigui et al., Dynamic Reallocation of SLA Parameters in Passive Optical Network Based on Clustering Analysis, 2018 21st Conference on Innovation in Clouds, Internet and Networks and Workshops (ICIN), Paris, 2018, pp. 1-8.
(Continued)

*Primary Examiner* — Khoa Huynh
(74) *Attorney, Agent, or Firm* — Knobbe, Martens, Olson & Bear, LLP (57) ABSTRACT

A method for managing resources of a converged fixed access and mobile radio telecommunications network, some of the resources being implemented in a virtualized and remote form in the network, optical resources of the network being allocated between an optical router and a plurality of optical modems of the network is disclosed. A module for centralized management of the mobile radio resources of the network implements receiving a performance indicator for a mobile radio part of the network transmitted by a base station of the network connected to one of the optical modems and/or by a module of remote virtualized radio functions in the network; estimating the optical resource (Continued)

requirements of the mobile radio part from the performance indicator, providing information representative of the optical resource requirements; and transmitting the information of the optical resource requirements to a module for centralized management of the fixed access and optical resources.

8 Claims, 3 Drawing Sheets

(56) References Cited

OTHER PUBLICATIONS

Frigui et al., Optimization of the Upstream Bandwidth Allocation in Passive Optical Networks Using Internet Users' Behavior Forecast, ONDM 2018—22nd International Conference on Optical Network Design and Modeling, May 2018, Dublin, Ireland, pp. 59-64.
Loumiotis et al., Dynamic Allocation of Backhaul Resources in Converged Wireless-Optical Networks, IEEE Journal on Selected Areas in Communications, vol. 35, No. 2, Feb. 1, 2017, pp. 280-287.
Suzuki et al., Optical Networking Technologies for Fixed and Mobile Convergence, 15th OptoElectronics and Communications Conference (OECC2010) Technical Digest, Jul. 5, 2010, Sapporo Convention Center, Japan, pp. 420-421.
International Search Report for International Application No. PCT/FR2019/052922, dated Feb. 20, 2020.

* cited by examiner

METHOD FOR MANAGING RESOURCES OF A CONVERGED FIXED ACCESS AND MOBILE RADIO TELECOMMUNICATIONS NETWORK, AND CORRESPONDING COMPUTER PROGRAM PRODUCT AND DEVICES

CROSS-REFERENCE TO RELATED APPLICATIONS

This application is filed under 35 U.S.C. § 371 as the U.S. National Phase of Application No. PCT/FR2019/052922 entitled "METHOD FOR MANAGING RESOURCES OF A MOBILE RADIO AND FIXED ACCESS CONVERGENT TELECOMMUNICATIONS NETWORK, AND CORRESPONDING COMPUTER PROGRAM PRODUCT AND DEVICES" and filed Dec. 4, 2019, and which claims priority to FR 1873463 filed Dec. 20, 2018, each of which is incorporated by reference in its entirety.

BACKGROUND

Field

The field of the invention is that of the implementation of converged fixed access and mobile radio telecommunications networks. The invention more particularly relates to resource management (e.g. the management of optical resources, radio resources, and virtualised resources, etc.) in such telecommunications networks.

The invention has numerous applications, in particular, but not limited to, the field of 3GPP (3rd Generation Partnership Project)-compliant telecommunications networks of the latest generations or of future generations.

Description of the Related Technology

Current so-called fixed access networks and mobile radio networks are managed independently.

More particularly, the front-end (e.g. the local loop to the end user) of some fixed access networks already rely heavily on the use of optical resources.

Moreover, future generation mobile radio networks aim to centralise and virtualise baseband processing in central units (CUs), which are remote and upstream in the network. The processed radio signals are then transmitted to the distributed units (DUs), for example the base stations, via optical fibres. The required capacity of the optical fibres between the CUs and the DUs (also referred to as front haul capacity) must be guaranteed by the optical network implemented.

In the context of converged fixed access and mobile radio telecommunications networks, so-called "Fibre-To-The-Home" (FTTH) optical infrastructures represent an interesting alternative that can be used as a shared infrastructure for the deployment of the front end (i.e. the part of the network responsible for conveying data to the base stations for the mobile radio part and the local loop for the fixed access part and) both of the fixed access and mobile radio parts of such converged networks.

More specifically, FTTH infrastructures currently represent the most reliable fixed access network infrastructure. Passive Optical Networks (PONs) represent one of the most attractive FTTH access network solutions. More specifically, PONs have been widely deployed for several years thanks to their ability to offer broadband services and to satisfy the needs of the majority of customers in terms of quality of service (QoS). Today's PONs are based on what is known as a "Dynamic Bandwidth Allocation" (DBA) mechanism, which is implemented in optical routers to allocate a given optical modem with the bandwidth it needs to serve an end user while taking into account the traffic status and requirements of other optical modems. The bandwidth allocated to each end user is controlled by the corresponding optical router as a function of the user profile (as defined for example in the standardisation document ITU-T G.984.3).

However, the allocation of resources in an FTTH architecture applied to a mobile radio network must be able to take into account the specificities of the mobile radio network in question. For example, the capacity allocated to the optical resources implemented in such a mobile radio network must be able to preserve the QoS of mobile users. The required capacity depends on the configuration of the base station considered. For example, fourth generation (4G) base stations, as per the 3GPP, can be manually configured to operate with a radio bandwidth of 1.4 MHz, 3 MHz, 5 MHz, 10 MHz, 15 MHz or 20 MHz. The available radio resources, i.e. the resource blocks (RBs), are allocated among the different mobile users connected to the base station in question. For example, a base station configured to operate with a 20 MHz bandwidth has 100 RBs to allocate to the different mobile users, whereas a base station configured to operate with a 10 MHz radio bandwidth has 50 RBs to allocate. These configurations represent the different user radio profiles managed by the network.

Furthermore, in the case of a future generation mobile radio network in which some functions are virtualised in the network, the haul capacity of the network depends on the functional distribution between the CUs and the DUs. For example, considering the virtualisation of the channel coding function within a CU (option 7.3 of the standardisation document 3GPP TS 38.801), the required front haul capacity for base stations with a radio bandwidth of 20 MHz, 10 MHz and 5 MHz is 100 Mbps, 50 Mbps and 25 Mbps respectively. These front haul capacities required for carrying data between the CUs and the DUs must thus be guaranteed to enable the mobile radio network to provide the expected performance levels for the corresponding user radio profiles.

Given the aforementioned specificities of FTTH networks, the configuration thereof according to current techniques can lead to an inefficient (e.g. non-optimised) allocation of the bandwidth of the optical resources allocated to the mobile radio part of a converged fixed access and mobile radio network.

There is thus a need for an improved technique for managing optical resources in a converged fixed access and mobile radio telecommunications network.

There is also a need for the technique in question to manage the other resources (e.g. virtualised resources, radio resources, etc.) of the network in a manner consistent with the optical resources.

SUMMARY OF CERTAIN INVENTIVE ASPECTS

One embodiment of the invention proposes a method for managing resources of a converged fixed access and mobile radio telecommunications network. At least part of the resources is implemented in a virtualised form and is remote in the network. Optical resources of the network are allocated between at least one optical router and a plurality of optical modems of the network. According to such a method, a module for the centralised management of the mobile radio resources of the network carries out the steps of: receiving at least one performance indicator for the mobile radio part of the network, referred to as a mobile radio performance indicator, transmitted by at least one base station (100*du*) of the network connected to one of the optical modems and/or by a remote virtualised radio function module (100*vran*) in the network and dedicated to the mobile radio part of the network; estimating the optical resource requirements of the mobile radio part of the network from at least said at least one mobile radio performance indicator, providing information representative of the optical resource requirements, referred to as optical mobile radio requirement information; and transmitting the optical mobile radio requirement information to a module for the centralised management of the fixed access and optical resources of the network for managing the optical resources of the network.

Thus, the invention proposes a novel and inventive solution for managing the optical resources used to transmit the data of both the fixed access part and of the mobile radio part of the telecommunications network, at least in the front end corresponding to the local network service (local loop for the fixed access part and data intended for the base stations for the mobile radio part).

More particularly, according to the method proposed, the module (software or hardware) for the centralised management of the mobile radio resources of the network (i.e. the resources dedicated to the operation of the mobile radio part of the network) decides on the optical resources required for data transfer over the mobile radio part of the network in order to optimise the performance levels of the mobile radio part of the network. Thus, the optical resources are, for example, adapted to the throughput requirements of the implemented radio profile (e.g. adapted to the number of radio resources allocated to a given base station).

According to one embodiment, the module for the centralised management of the mobile radio resources further carries out the steps of: estimating the virtualised resource requirements of the mobile radio part of the network from at least said at least one mobile radio performance indicator, providing information representative of the virtualised resource requirements, referred to as virtualised mobile radio requirement information; and transmitting the virtualised mobile radio requirement information to a module for the centralised management of the remote virtualised resources in the network, for managing the virtualised resources of the network.

Thus, the module for the centralised management of the mobile radio resources of the network decides on the remote resources in the network that are required to implement the associated functions over the mobile radio part of the network in order to optimise the performance levels of the mobile radio part of the network (e.g. the virtualised mobile radio requirement information corresponds to a computing capacity requirement, storage capacity requirement or read/write capacity requirement). Thus, the virtualised resources are, for example, adapted to the throughput requirements of the implemented radio profile (e.g. to the number of radio resources allocated to a given base station).

According to one embodiment, the module for the centralised management of mobile radio resources further carries out the steps of: estimating the radio resource requirements of the mobile radio part of the network from at least the mobile radio performance information, providing information representative of the radio resource requirements, referred to as radio requirement information; and transmitting the radio requirement information to said at least one base station of the network and/or to the module of remote virtualised radio functions in the network and dedicated to the mobile radio part of the network, for managing the radio resources of the network.

Thus, the module for the centralised management of the mobile radio resources of the network also decides on the radio resources, i.e. the radio user profile, in order to optimise the performance levels of the mobile radio part of the network (e.g. the radio requirement information corresponds to a number of radio resources that must be allocated to a given base station).

According to one embodiment, said at least one mobile radio performance indicator belongs to the group comprising: a rate of use of the radio resources on the air interface of the mobile radio part of the network; a number of radio resources actually used from among the radio resources allocated to a given base station; and a number of virtualised resources allocated to a given base station in the module of virtualised radio functions.

For example, the mobile radio part of the network multiplexes the data into time and frequency distributed resource blocks (e.g. the mobile radio part of the network implements a 5G protocol as per the 3GPP). In such a case, the radio resources are, for example, resource blocks.

In one embodiment of the invention, the plurality of optical modems comprises: at least one so-called fixed access optical modem, at least one fixed user equipment item being connected to a fixed access part of the network via the fixed access optical modem; and at least one so-called mobile radio optical modem, at least one base station being connected to a mobile radio part of the network via said at least one mobile radio optical modem.

The invention thus proposes a module for the centralised management of the fixed access and optical resources of the network that carries out the following steps of the management method: receiving at least one performance indicator of the fixed access part of the network, referred to as the fixed access performance indicator, transmitted by at least one module belonging to the group comprising: said at least one optical router; said at least one fixed access optical modem; said at least one mobile radio optical modem; and at least one module of virtualised fixed equipment functions, receiving information representative of optical resource requirements of the mobile part of the network, referred to as optical mobile radio requirement information, transmitted by a module for the centralised management of the mobile radio resources of the network; reallocating the optical resources between, on the one hand, said at least one optical router and said at least one fixed access optical modem and, on the other hand, said at least one optical router and said at least one mobile radio optical modem as a function of said at least one fixed access performance indicator and optical mobile radio requirement information, providing at least one item of information representative of the reallocation of optical resources, referred to as fixed access and mobile radio reallocation information.

Thus, the module for the centralised management of the fixed access and optical resources of the network (i.e. the optical resources dedicated to the operation of both the mobile radio and fixed access parts of the network and the other resources, referred to as fixed access resources, dedicated to the operation of the fixed access part of the network) jointly optimises the optical resources dedicated to the fixed access part and to the mobile radio part in order to optimise the performance levels of the network. For example, the module for the centralised management of the fixed access and optical resources takes into account the fact that certain performance levels of the mobile users must be guaranteed while fixed users are served as best as possible.

According to one embodiment, the module for the centralised management of the fixed access and optical resources further carries out the steps of: transmitting said at least one item of fixed access and mobile radio reallocation information to said at least one optical router for the reallocation of the optical resources between, on the one hand, said at least one optical router and said at least one fixed access optical modem and, on the other hand, said at least one optical router and said at least one mobile optical modem.

According to one embodiment, the module for the centralised management of the fixed access and optical resources further carries out the steps of: estimating the virtualised resource requirements of the fixed access part of the network from at least said at least one fixed access performance indicator, providing information representative of the virtualised resource requirements, referred to as virtualised fixed access requirement information; and transmitting the virtualised fixed access requirement information to a module for the centralised management of the remote virtualised resources in the network, for managing the virtualised resources of the network.

Thus, the module for the centralised management of the fixed and optical resources of the network decides on the remote virtualised resources in the network required to implement the associated functions over the fixed access part of the network in order to optimise the corresponding performance levels (e.g. the virtualised fixed access requirement information corresponds to a computing capacity requirement, storage capacity requirement or read/write capacity requirement).

One embodiment of the invention proposes a module for the centralised management of the remote virtualised resources in the network that carries out the following steps of the management method: receiving information representative of virtualised resource requirements of the mobile radio part of the network, referred to as virtualised mobile radio requirement information, transmitted by a module for the centralised management of the mobile radio resources of the network; receiving information representative of virtualised resource requirements of the fixed access part of the network, referred to as virtualised fixed access requirement information, transmitted by a module for the centralised management of the fixed access and optical resources of the network; and reallocating the virtualised resources as a function of the virtualised mobile radio requirement information and of the virtualised fixed-access requirement information.

Thus, the module for the centralised management of the virtualised resources of the network allocates resources (e.g. a computing capacity, a storage capacity or a read/write capacity) dedicated to either the fixed access part or to the mobile radio part, in order to implement the virtualised functions required by the parts in question.

According to one embodiment, the aforementioned steps of the method are carried out periodically.

According to one embodiment, the optical resources are implemented in a so-called "Fibre-To-The-Home" infrastructure.

The invention further relates to a computer program comprising program code instructions for implementing the method as described hereinabove, according to any one of the different embodiments thereof, when it is executed on a computer.

One embodiment of the invention proposes a device for the centralised management of the mobile radio resources of a converged fixed access and mobile radio telecommunications network. Such a management device comprises a reprogrammable computing machine or a dedicated computing machine configured to implement the steps of the management method according to the invention as carried out by the module for the centralised management of the mobile radio resources of the network (according to any one of the aforementioned different embodiments).

Thus, the features and advantages of this device are the same as those of the corresponding steps of the management method described hereinabove. As a result, they are not described in more detail.

One embodiment of the invention proposes a device for the centralised management of the fixed access and optical resources of a converged fixed access and mobile radio telecommunications network. Such a management device comprises a reprogrammable computing machine or a dedicated computing machine configured to implement the steps of the management method according to the invention as carried out by the module for the centralised management of the fixed access and optical resources of the network (according to any one of the aforementioned different embodiments).

Thus, the features and advantages of this device are the same as those of the corresponding steps of the management method described hereinabove. As a result, they are not described in more detail.

One embodiment of the invention proposes a device for the centralised management of the remote virtualised resources in a converged fixed access and mobile radio telecommunications network. Such a management device comprises a reprogrammable computing machine or a dedicated computing machine configured to implement the steps of the management method according to the invention as carried out by the module for the centralised management of the remote virtualised resources in the network (according to any one of the aforementioned different embodiments).

Thus, the features and advantages of this device are the same as those of the corresponding steps of the management method described hereinabove. As a result, they are not described in more detail.

One embodiment of the invention proposes a converged fixed access and mobile radio telecommunications network node. Such a network node comprises at least one of the aforementioned devices (according to any one of the aforementioned different embodiments), i.e. a device for the centralised management of the mobile radio resources of a network, a device for the centralised management of the fixed access and optical resources of the network and a device for the centralised management of the remote virtualised resources in the network.

BRIEF DESCRIPTION OF THE DRAWINGS

Other purposes, features and advantages of the invention will be better understood upon reading the following description, which is given as a rough guide and in no way as a limited guide, with reference to the accompanying figures, in which.

DETAILED DESCRIPTION OF CERTAIN ILLUSTRATIVE EMBODIMENTS

The general principle of the invention is based on the collection of performance indicators for the fixed access part as well as for the mobile radio part of a converged fixed access and mobile radio telecommunications network in order to estimate and allocate, in an optimised way, the optical resources and/or the other resources (e.g. radio resources, virtualised resources, etc.) of the network between the mobile radio and fixed access parts in question.

Figure 1:
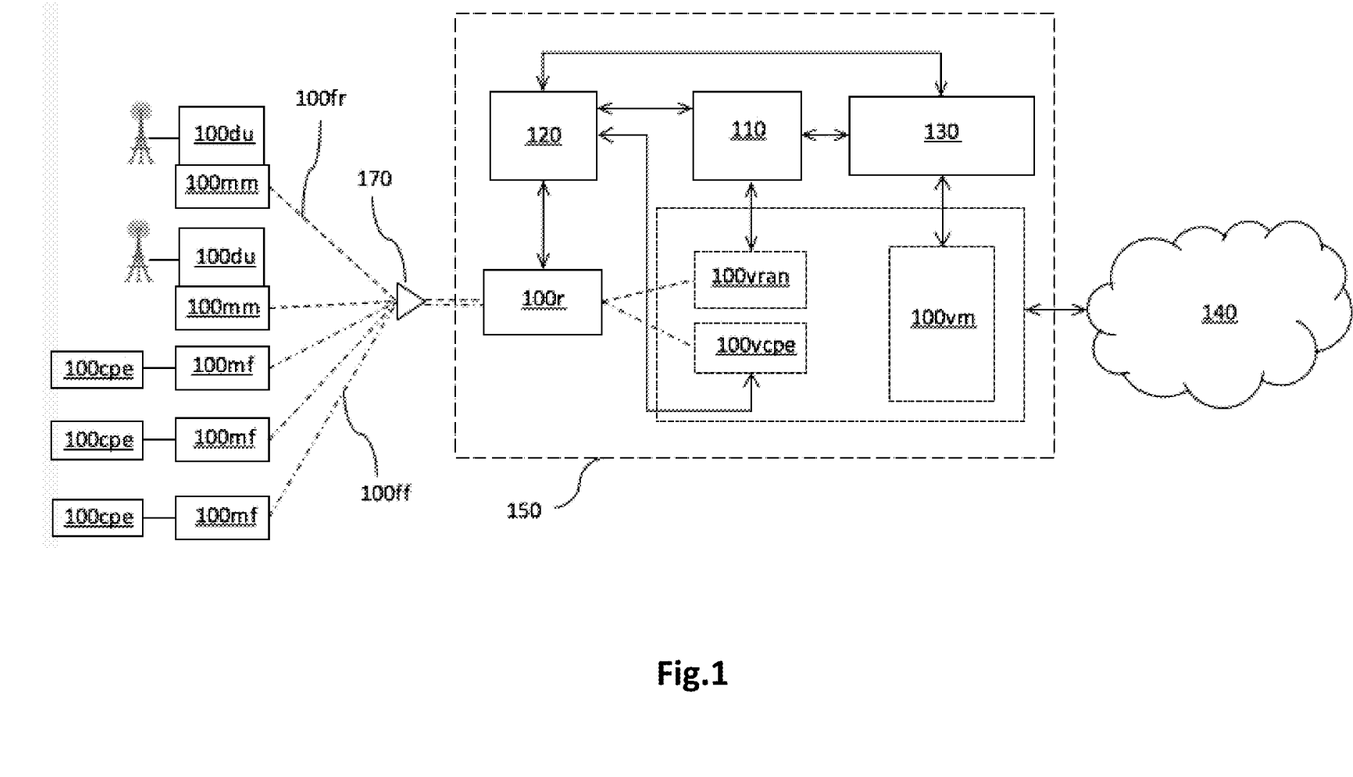
FIG. 1 shows the architecture of a converged fixed access and mobile radio telecommunications network, the resources whereof are managed by a management method according to one embodiment of the invention.

With reference to FIG. 1, the architecture of a converged fixed access and mobile radio telecommunications network will now be presented, the resources whereof are managed by a management method according to one embodiment of the invention.

In the network in question, a node 150 of the converged fixed access and mobile radio network is connected, upstream, to the network core 140 itself and, downstream, to a plurality of optical modems of the network. The plurality of optical modems comprises: so-called fixed access optical modems 100mf, at least one fixed user equipment item 100cpe being connected to the fixed access part of the network via a corresponding fixed access optical modem 100mf; and so-called mobile radio optical modems 100mm, at least one base station 100du being connected to a mobile radio part of the network via a corresponding mobile radio optical modem 100mm.

More particularly, the plurality of optical modems 100mf, 100mm is connected to an optical router 100r of the node 150 via optical resources, in this case optical fibres 100fr, 100ff passing through a multiplexer 170. The fixed access optical modems 100mf are connected to the optical router 100r by corresponding optical fibres 100ff and the mobile radio optical modems 100mm are connected to the optical router 100r by corresponding optical fibres 100fr (e.g. according to an FTTH-type infrastructure).

In other embodiments, a single fixed access optical modem 100mf and/or a single mobile radio optical modem 100mm connected to the optical router 100r can be present.

Referring back to FIG. 1, the module 120 is a module for the centralised management of both: the optical resources dedicated to the operation of both the mobile radio part and the fixed access part of the network; and the other resources, referred to as fixed access resources, dedicated more specifically to the operation of the fixed access part of the network.

In the present application, the module 120 is also referred to as the "module for the centralised management of the fixed access and optical resources". Furthermore, it should be noted that the term "module" can correspond to a software component as well as to a hardware component or to a set of hardware and software components, a software component itself corresponding to one or more computer programs or sub-programs or, more generally, to any element of a program capable of implementing a function or a set of functions such as those described for the modules concerned. Similarly, a hardware component corresponds to any element of a hardware assembly capable of implementing a function or a set of functions for the module concerned (integrated circuit, integrated circuit card, memory card, etc.).

As described hereinbelow with reference to FIG. 2, the module 120 manages, in a centralised manner, inter alia, the optical resources of the network on the basis of, on the one hand, at least one performance indicator for the fixed access part of the network, referred to as the "fixed access performance indicator" and, on the other hand, at least one item of information representative of the optical resource requirements of the mobile part of the network, referred to as the "optical mobile radio requirement information".

The one or more fixed access performance indicators are transmitted in particular by the optical router 100r and/or all or part of the optical modems 100mm, 100mf via the optical router 100r, and/or by the module 100vcpe of remote virtualised functions in the network and dedicated to a corresponding fixed user equipment item 100cpe. In the present application, the module 100vcpe is also referred to as the "module of virtualised fixed equipment functions".

Moreover, the optical mobile radio requirement information is determined and transmitted to the module 120 by the module 110. The module 110 determines the optical mobile radio requirement information from at least one performance indicator, referred to as the "mobile radio performance indicator", transmitted by all or part of the base stations 100du and/or by the module 100vran of remote virtualised radio functions in the network and dedicated to the mobile radio part of the network. For example, the module 100vran corresponds to a central unit CU as per the 3GPP. In other embodiments, a plurality of modules 100vran of remote virtualised radio functions in the network are instantiated and the module 110 determines the optical mobile radio requirement information from performance indicators transmitted by all or part of the corresponding modules 100vran.

Referring back to FIG. 1, the module 110 is a module for the centralised management of the resources dedicated to the operation of the mobile radio part of the network. In the present application, the module 110 is also referred to as the "module for the centralised management of the mobile radio resources". By way of example, the module 110 could be similar to the C-SON (Centralised Self-Organising Network") as defined within the 3GPP, but in this case with new functionalities allowing the resources of the network to be managed according to the technique described.

As described hereinbelow with reference to [FIG. 2], the module 120 can also estimate information representative of virtualised resource requirements of the fixed access part of the network, referred to as the "virtualised fixed access requirement information" on the basis of the aforementioned performance indicators for the fixed access part of the network. In such a case, the module 120 transmits this virtualised fixed access requirement information that it has estimated to the module 130. In other embodiments, a plurality of modules 100vcpe of virtualised fixed equipment functions are instantiated (e.g. as a function of the number of fixed user equipment items 100cpe connected) and the module 120 thus determines the virtualised fixed access requirement information from performance indicators transmitted by all or part of the corresponding modules 100vcpe.

Referring back to FIG. 1, on the basis of the aforementioned performance indicators for the mobile radio part of the network, the module 110 can also estimate and transmit, to the module 130, information representative of the virtualised resource requirements of the mobile radio part of the network, referred to as "virtualised mobile radio requirement information".

In such a case, the module 130 for the centralised management of the remote virtualised resources in the network manages, in a centralised manner, the virtualised resources 100vm (in terms of hardware resources, e.g. computing capacity, storage capacity, read/write capacity, etc.) of the network on the basis, on the one hand, of the virtualised mobile radio requirement information and, on the other hand, of the virtualised fixed access requirement information. The virtualised resources 100vm are thus reallocated on the basis of the information in question to the virtualised functions dedicated, on the one hand, to the mobile radio part of the network (e.g. the module 100vRAN) and, on the other hand, to the fixed access part of the network (e.g. the module 100vcpe of virtualised fixed equipment functions).

Similarly, on the basis of the aforementioned performance indicators for the mobile radio part of the network, the module 110 can also estimate and transmit, to the base stations 100du, or to the module 100vran of remote virtualised radio functions in the network, information representative of the radio resource requirements of the mobile radio part of the network, referred to as radio requirement information. For example, the information in question corresponds to a number of radio resources that must be allocated to a given base station.

Figure 2:
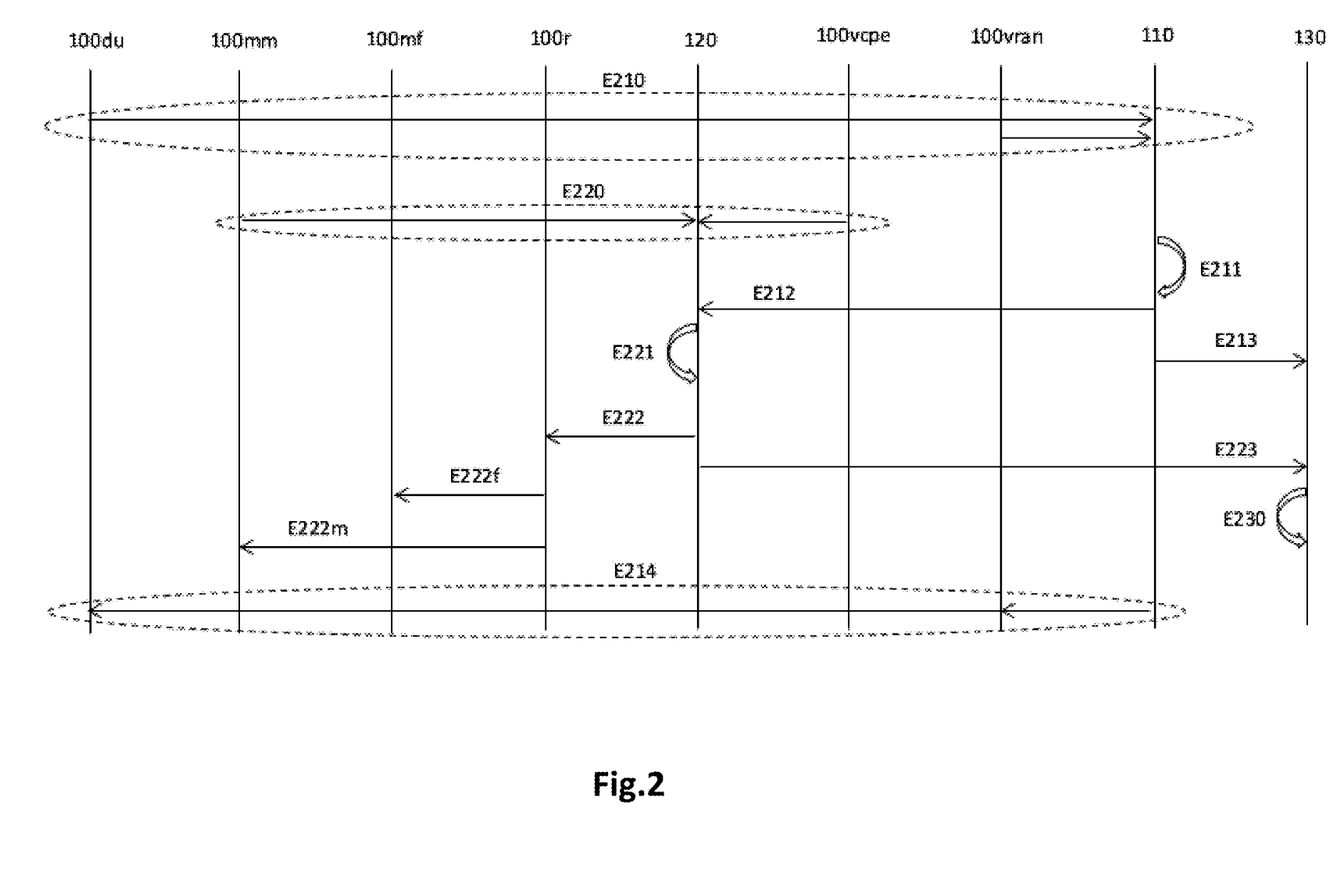
FIG. 2 shows the steps of a method for managing the resources of the network in [FIG. 1] according to one embodiment of the invention.

With reference to FIG. 2, the steps of a method for managing the resources of the network in FIG. 1 according to one embodiment of the invention will now be presented.

The steps of the management method implemented by the module 110 for the centralised management of the mobile radio resources are firstly presented.

In a step E210, the module 110 receives the one or more mobile radio performance indicators transmitted by the base stations 100du as well as by the module 100vran.

For example, such a mobile radio performance indicator belongs to the group comprising: a rate of use of the radio resources on the air interface of the mobile radio part of the network (e.g. a rate of use of the RBs when the mobile radio part of the network implements a 4G or 5G protocol according to the 3GPP); a number of radio resources actually used from among the radio resources allocated to a given base station; and a number of virtualised resources allocated to a given base station in the module 100vran.

In other embodiments, the module 110 receives the one or more mobile radio performance indicators transmitted only by the base stations 100du (or at least by one thereof), e.g. when the considered network does not implement virtualised resources dedicated to the mobile radio part.

Conversely, in other embodiments, the module 110 receives the one or more mobile radio performance indicators transmitted only by the module 100vran (or optionally by a plurality of modules 100vran when a plurality of such modules are instantiated in the network).

According to the embodiment in FIG. 2, in a step E211, using the one or more mobile radio performance indicators received in step E210, the module 110 estimates: the optical resource requirements of the mobile radio part of the network providing information representative of the optical resource requirements, referred to as "optical mobile radio requirement information" (for example, the optical mobile radio requirement information corresponds to a minimum throughput allocated to the optical resources 100fr); the virtualised resource requirements of the mobile radio part of the network providing information representative of the virtualised resource requirements, referred to as "virtualised mobile radio requirement information" (for example, the virtualised mobile radio requirement information corresponds to a computing capacity requirement, a storage capacity requirement or a read/write capacity requirement); and the radio resource requirements of the mobile radio part of the network providing information representative of the radio resource requirements, referred to as "radio requirement information" (for example, the radio requirement information corresponds to a radio user profile).

Thus, the module 120 for the centralised management of the mobile radio resources of the network decides on the optical, virtualised and radio resources, in order to optimise the performance levels of the mobile radio part of the network.

For example, using the one or more mobile radio performance indicators, the module 110 selects a radio user profile (e.g. the radio bandwidth of 1.4 MHz, 3 MHz, 5 MHz, 10 MHz, 15 MHz or 20 MHz for a given base station when the mobile radio part of the network implements a 4G or 5G protocol according to the 3GPP) that is better adapted to the requirements reported by the indicators in question (e.g. if all the RBs allocated to a given base station are used, the module 100 estimates that a higher bandwidth must be allocated to the base station in question), as well as an associated virtualised profile that must be used by the module 100vran. On the basis of this radio user profile, the module 110 estimates the optical resources and the virtualised resources required for the correct operation of the mobile radio part of the network implementing the selected radio user profile (for example, the module 110 whose virtualised functions will guarantee a network latency as specified in the 3GPP standard considered).

In other embodiments, the module 110 estimates only some of the aforementioned radio resource, optical resource and virtualised resource requirements. For example, the radio resources can be predefined and the module 110 is only able to adapt the optical resources and, optionally, the virtualised resources. Thus, depending on the implementations considered, the module 110 can estimate all or part of the radio resource requirements and virtualised resource requirements, in addition to the optical resource requirements.

Referring back to FIG. 2, in a step E212, the module 110 transmits the optical mobile radio requirement information for managing the optical resources of the network to the module 120.

Similarly, in a step E213, the module 110 transmits the virtualised mobile radio requirement information for managing the virtualised resources of the network to the module 130.

Finally, in a step E214, the module 110 transmits the radio requirement information for managing the radio resources of the network, e.g. for updating the user radio profile (e.g. the allocated radio bandwidth, etc.) associated with the one or more base stations 100du in question to the module 100vran and/or to at least one base station 100du.

In the aforementioned embodiments wherein the module 110 only estimates a part of the radio resource requirements and virtualised resource requirements in addition to the optical resource requirements, only the corresponding transmission steps E212 or E213 or E214 are implemented.

Referring back to FIG. 2, the steps of the management method implemented by the module 120 for the centralised management of the fixed access and optical resources will now be presented.

In a step E220, the module 120 receives the one or more fixed access performance indicators transmitted by at least one module belonging to the group comprising: an optical router 100*r*; one of the fixed access optical modems 100*mf*; one of the mobile radio optical modems 100*mm*; and the module 100*vcpe*.

For example, such a fixed access performance indicator corresponds to a rate of use of the optical resources allocated to the fixed access part of the network, or to a computational load of the virtualised resources allocated to the fixed access part of the network.

In step E212, the module 120 receives the optical mobile radio requirement information transmitted by the module 110.

In a step E221, the module 120 reallocates the optical resources between, on the one hand, the optical router 100*r* and the fixed access optical modems 100*mf* and, on the other hand, the optical router 100*r* and the mobile radio optical modems 100*mm* as a function of the one or more fixed access performance indicators and of the optical mobile radio requirement information. At least one information item representing the reallocation of optical resources, referred to as the "fixed access and mobile radio reallocation information", is thus provided by the module 120. For example, a first and a second information item, more particularly representative of the optical resources that must be allocated respectively to the mobile radio part and to the fixed access part of the network are thus provided.

In this way, the module 120 jointly optimises the optical resources dedicated to the fixed access part and to the mobile radio part in order to optimise the performance levels of the network. For example, the module 120 takes into account the fact that certain performance levels of the mobile users must be guaranteed while fixed users are served as best as possible. In alternative embodiments, in order to optimise the QoS of users connected to the fixed access part of the network, the module 120 implements a method as described in the conference paper by N. E. Frigui, T. Lemlouma, S. Gosselin, B. Radier, R. Le Meur et al.: "*Optimization of the Upstream Bandwidth Allocation in Passive Optical Networks Using Internet Users' Behavior Forecast*", ONDM 2018—22nd International Conference on Optical Network Design and Modeling, May 2018, Dublin, Ireland.

Thus, in a step E222, the module 120 transmits the at least one fixed access and mobile radio reallocation information item (for example the first and second information items mentioned hereinabove) to the router 100*r* for reallocation of the optical resources between, on the one hand, the router 100*r* and the fixed access optical modems 100*mf* and, on the other hand, the router 100*r* and the mobile optical modems 100*mm* (for example, the router 100*r* transmits, on the one hand, the aforementioned first information item to the mobile optical modems 100*mm* in a step E222*m* and, on the other hand, the aforementioned second information item to the fixed access optical modems 100*mf* in a step E222*f*). In alternative embodiments, in order to optimise the reallocation of the optical resources, the router 100*r* implements a method as described in the conference paper by N. E. Frigui, T. Lemlouma, S. Gosselin, B. Radier, R. Le Meur and J. Bonnin, "*Dynamic Reallocation of SLA Parameters in Passive Optical Network Based on Clustering Analysis,*" 2018 21st Conference on Innovation in Clouds, Internet and Networks and Workshops (ICIN), Paris, 2018, pp. 1-8.

Furthermore, in step E221, the module 120 can also estimate the virtualised fixed access requirement information (e.g., a computing capacity requirement, storage capacity requirement, or read/write capacity requirement for the fixed access part of the network) as a function of the one or more fixed access performance indicators. In such a case, in a step E223, the module 120 transmits the virtualised fixed access requirement information to the module 130 for managing the virtualised resources of the network.

In other embodiments, the module 120 can also, in step E221, not estimate the virtualised fixed access requirement information. In such a case, the transmission step E223 is not implemented.

Referring back to FIG. 2, the steps of the management method implemented by the module 130 for the centralised management of the remote virtualised resources in the network will now be presented.

In step E213, the module 130 advantageously receives the virtualised mobile radio requirement information transmitted by the module 110. Similarly, in step E223, the module 130 advantageously receives the virtualised fixed access requirement information transmitted by the module 120.

Thus, in a step E230, the module 130 reallocates the virtualised resources as a function of the virtualised mobile radio requirement information and of the virtualised fixed-access requirement information.

For example, the module 130 allocates resources (e.g. a computing capacity, a storage capacity or a read/write capacity) dedicated to either the fixed access part or to the mobile radio part, in order to implement the virtualised functions required by the parts in question (e.g. the functions implemented in the modules 100*vran* or 100*vcpe*).

In other embodiments, steps E213 and E223 are not implemented by the modules 110 and 120 respectively. In such a case, the module 130 does not implement step E230.

In some embodiments, the aforementioned steps of the management method (according to any one of the aforementioned embodiments) are implemented periodically in order to, for example, adapt the resources of the network to the changing needs of the end users over time.

Figure 3:
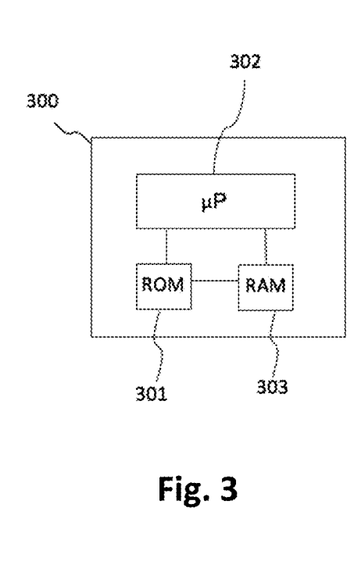
FIG. 3 shows one example of a device structure allowing the steps of the method in [FIG. 2] to be implemented according to one embodiment of the invention.

With reference to FIG. 3, one example of a device 300 structure allowing the steps of the management method in FIG. 2 to be implemented according to one embodiment of the invention will now be presented.

The device 300 comprises a read/write memory 303 (for example a RAM), a processing unit 302 equipped, for example, with a processor, and driven by a computer program stored in a read-only memory 301 (for example a ROM or a hard disk). On start-up, the code instructions of the computer program are, for example, loaded in the read/write memory 303 before being executed by the processor of the processing unit 302.

This FIG. 3 shows only one specific way, out of several possible ways, of producing the device 300 so that it carries out certain steps of the management method according to the invention (according to any one of the embodiments and/or alternative embodiments described hereinabove with reference to [FIG. 2]). More specifically, these steps can be indifferently implemented either on a reprogrammable computing machine (a PC, a DSP or a microcontroller) running a program comprising a sequence of instructions, or on a dedicated computing machine (for example a set of logic gates such as an FPGA or an ASIC, or any other hardware module).

In the case where the device 300 is produced using a reprogrammable computing machine, the corresponding program (i.e. the sequence of instructions) may or may not be stored in a removable storage medium (such as a floppy disk, a CD-ROM or a DVD-ROM), which storage medium can be fully or partially read by a computer or a processor.

In certain embodiments, the device 300 implements any one of the management modules 110, 120 or 130. In other embodiments, the device 300 implements a plurality or all of the management modules 110, 120 or 130. Finally, in certain embodiments, the device 300 is included in a network node, e.g. in the node 150.

The invention claimed is:

1. A method of managing resources of a converged fixed access and mobile radio telecommunications network, at least some of said resources being implemented in a virtualized and remote form in said network, optical resources of said network being allocated between at least one optical router and a plurality of optical modems of said network, said plurality of optical modems comprising:
   at least one fixed access optical modem, at least one fixed user equipment item being connected to a fixed access part of said network via said fixed access optical modem; and
   at least one mobile radio optical modem, at least one base station being connected to a mobile radio part of said network via said at least one mobile radio optical modem, wherein a module for centralized management of the fixed access and optical resources of said network implements:
      receiving at least one performance indicator of said fixed access part of said network, referred to as a fixed access performance indicator, transmitted by at least one module belonging to the group comprising:
         said at least one optical router;
         said at least one fixed access optical modem;
         said at least one mobile radio optical modem; and
         at least one module of virtualized fixed equipment functions,
      receiving information representative of optical resource requirements of said mobile radio part of said network, referred to as optical mobile radio requirement information, transmitted by a module for centralized management of mobile radio resources of said network;
      reallocating said optical resources between, firstly, said at least one optical router and said at least one fixed access optical modem and, secondly, said at least one optical router and said at least one mobile radio optical modem as a function of said at least one fixed access performance indicator and said optical mobile radio requirement information, providing at least one item of information representative of said reallocation of optical resources, referred to as fixed access and mobile radio reallocation information.

2. The method of claim 1, wherein said module for the centralized management of the fixed access and optical resources further implements:
   transmitting said at least one item of fixed access and mobile radio reallocation information to said at least one optical router for the reallocation of said optical resources between, firstly, said at least one optical router and said at least one fixed access optical modem and, secondly, said at least one optical router and said at least one mobile optical modem.

3. The method of claim 1, wherein said module for the centralized management of the fixed access and optical resources further implements:
   estimating virtualized resource requirements of said fixed access part of said network from at least said at least one fixed access performance indicator, providing information representative of said virtualized resource requirements, referred to as virtualized fixed access requirement information; and
   transmitting said virtualized fixed access requirement information to a module for centralized management of remote virtualized resources in said network, for managing the virtualized resources of said network.

4. A method of managing resources of a converged fixed access and mobile radio telecommunications network, at least some of said resources being implemented in a virtualized and remote form in said network, optical resources of said network being allocated between at least one optical router and a plurality of optical modems of said network,
   wherein a module for centralized management of remote virtualized resources in said network implements:
      receiving information representative of virtualized resource requirements of a mobile radio part of said network, referred to as virtualized mobile radio requirement information, transmitted by a module for centralized management of mobile radio resources of said network;
      receiving information representative of virtualized resource requirements of a fixed access part of said network, referred to as virtualized fixed access requirement information, transmitted by a module for centralized management of fixed access and the optical resources of said network; and
      reallocating said virtualized resources as a function of said virtualized mobile radio requirement information and of said virtualized fixed-access requirement information.

5. A device for centralized management of fixed access and optical resources of a converged fixed access and mobile radio telecommunications network, at least some of said resources being implemented in a virtualized and remote form in said network, optical resources of said network being allocated between at least one optical router and a plurality of optical modems of said network, said plurality of optical modems comprising:
   at least one fixed access optical modem, at least one fixed user equipment item being connected to a fixed access part of said network via said fixed access optical modem; and
   at least one mobile radio optical modem, at least one base station being connected to a mobile radio part of said network via said at least one mobile radio optical modem,
   said device comprising a reprogrammable computing machine or a dedicated computing machine, configured for:
      receiving at least one performance indicator of said fixed access part of said network, referred to as a fixed access performance indicator, transmitted by at least one module belonging to the group comprising:
         said at least one optical router;
         said at least one fixed access optical modem;
         said at least one mobile radio optical modem; and
         at least one module of virtualized fixed equipment functions,
      receiving information representative of optical resource requirements of said mobile part of said network, referred to as optical mobile radio requirement information, transmitted by a module for centralized management of mobile radio resources of said network; and
      reallocating said optical resources between, firstly, said at least one optical router and said at least one fixed access optical modem and, secondly, said at least one optical router and said at least one mobile radio optical modem as a function of said at least one fixed access performance indicator and said optical mobile radio requirement information, providing at least one item of information representative of said reallocation of optical resources, referred to as fixed access and mobile radio reallocation information.

6. A node of a converged fixed access and mobile radio telecommunications network, wherein the node comprises at least one device of claim 5.

7. A device for centralized management of remote virtualized resources in a converged fixed access and mobile radio telecommunications network, at least some of said resources being implemented in a virtualized and remote form in said network, optical resources of said network being allocated between at least one optical router and a plurality of optical modems of said network, said device comprising a reprogrammable computing machine or a dedicated computing machine, configured for:

receiving information representative of virtualized resource requirements of a mobile radio part of said network, referred to as virtualized mobile radio requirement information, transmitted by a module for centralized management of mobile radio resources of said network;

receiving information representative of virtualized resource requirements of a fixed access part of said network, referred to as virtualized fixed access requirement information, transmitted by a module for centralized management of fixed access and the optical resources of said network; and reallocating said virtualized resources as a function of said virtualized mobile radio requirement information and of said virtualized fixed-access requirement information.

8. A node of a converged fixed access and mobile radio telecommunications network, wherein the node comprises at least one device of claim 7.

* * * * *